Dec. 5, 1933.    H. J. ROBER    1,938,041
WHEEL STRUCTURE
Filed Sept. 15, 1931    2 Sheets-Sheet 2
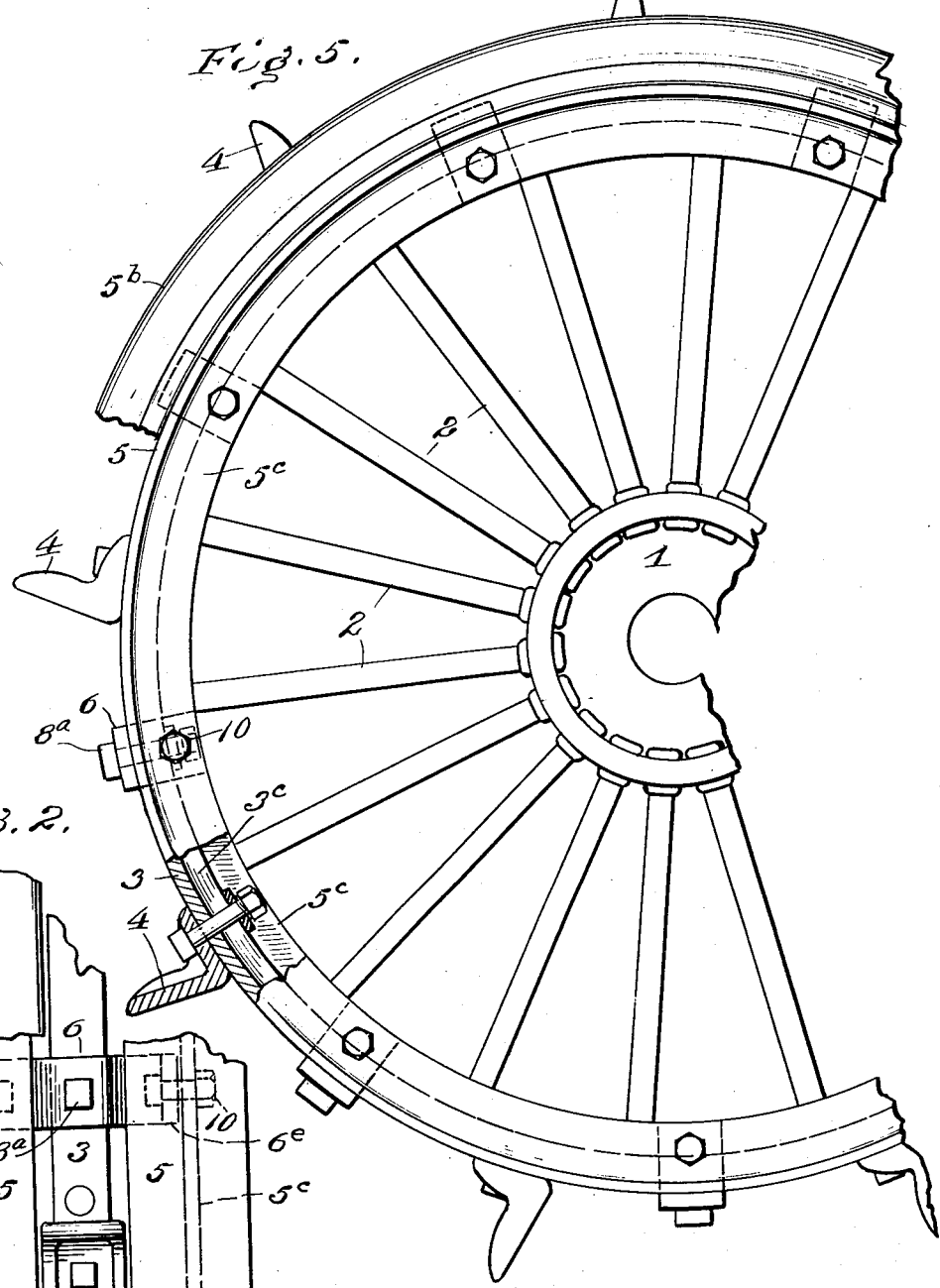
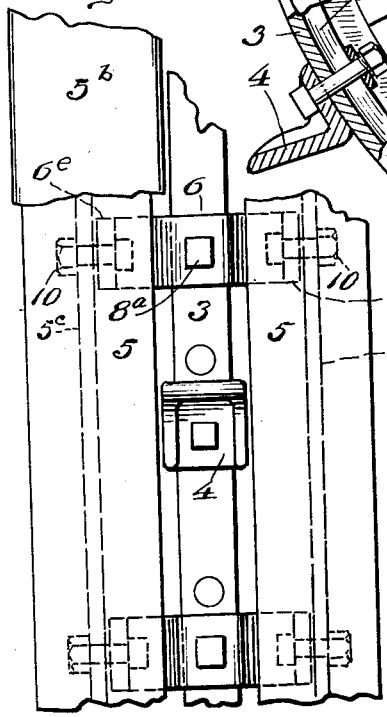
INVENTOR
H. J. Rober
BY
Morrison, Kennedy Campbell
ATTORNEYS Patented Dec. 5, 1933

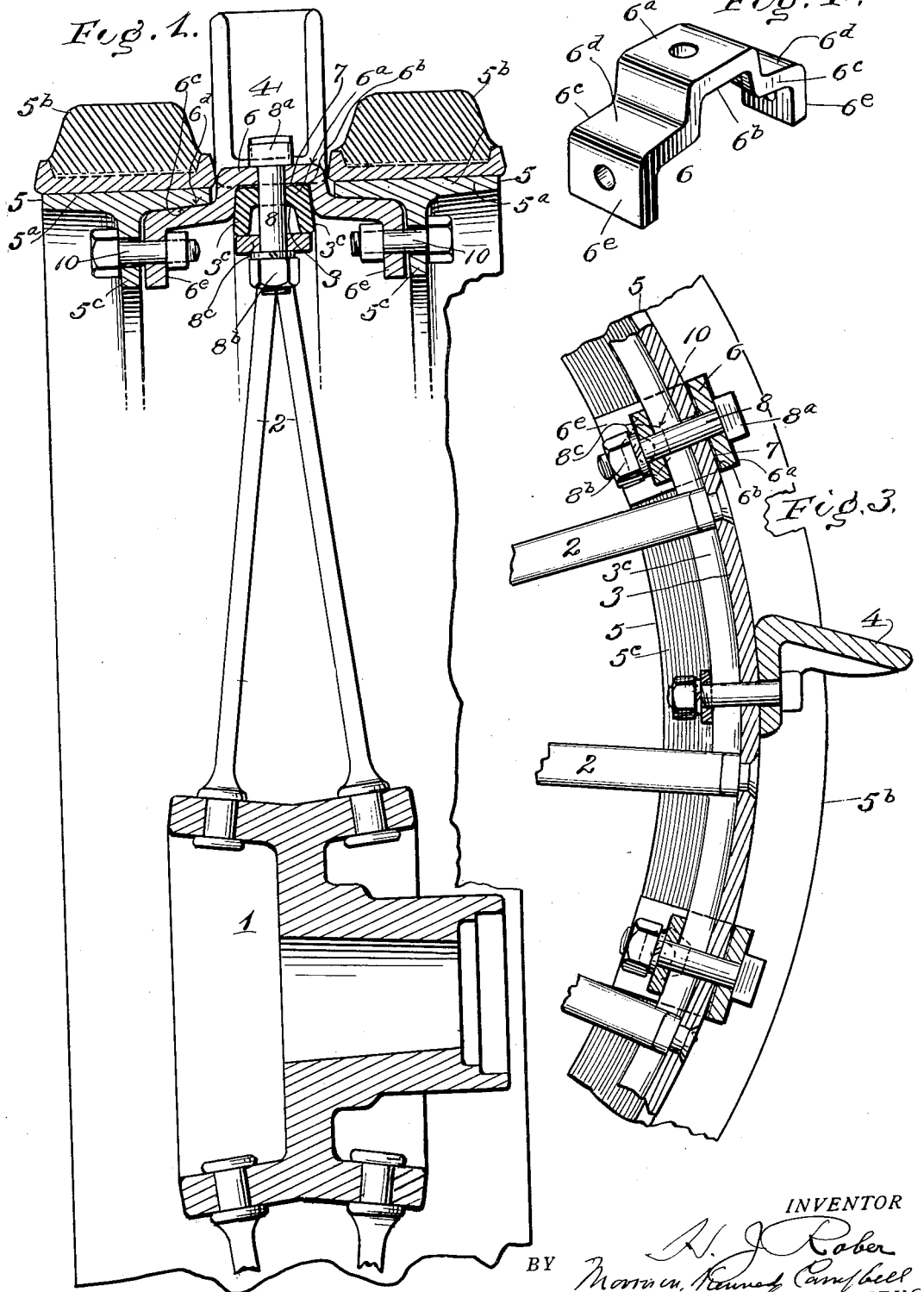

1,938,041

UNITED STATES PATENT OFFICE 1,938,041

WHEEL STRUCTURE

Henry J. Rober, Springfield, Ohio, assignor to French & Hecht, Incorporated, a corporation of Iowa Application September 15, 1931
Serial No. 562,892

4 Claims. (Cl. 301—39)

This invention relates to wheel structures, and has in view the provision of an extension rim or rims in connection with the main rim of the wheel, in order to secure a more effective tractive action than that given by the main rim alone.

The invention is concerned more particularly with wheel structures in which the main rim is equipped with traction cleats or lugs, which, while under certain conditions of use, will act satisfactorily, will under other conditions fail to act with the tractive effect desired; and it has been found in practice that by increasing the total width of the rim, by the provision of an extension rim or rims, without necessarily removing or disturbing the traction cleats when such are employed, the desired results may be secured.

The present invention contemplates improved means for the attachment at will to the main rim of a wheel, an extension rim or rims; and in the specification to follow the invention will be described in detail, and the novel features thereof will be pointed out in the appended claims.

In the accompanying drawings:

Fig. 1 is a section taken axially through a wheel structure having my invention embodied therein;

Fig. 2 is a plan view of the same;

Fig. 3 is a longitudinal section through the same;

Fig. 4 is a perspective view of one of the extension rim supporting yokes;

Fig. 5 is a fragmentary side elevation of the form of wheel shown in Fig. 1, parts being shown in section.

Referring to the drawings:

The wheel shown in the accompanying drawings to which the invention is applied, comprises a hub 1, spokes 2, and a main rim 3, in this instance in the form of a channel rim member with the channel disposed inwardly, and having the outer ends of the spokes riveted thereto; the side faces 3$^c$ of the rim sloping outwardly in opposite directions from each other for the purposes presently to be described.

In the form of the wheel shown, the rim is equipped with a series of traction lugs or cleats 4 fastened to the rim at intervals therearound, although for the purposes of the present invention, as will later appear, these traction cleats may be entirely omitted.

In accordance with the present invention, the effective width of the rim is increased by the application thereto of extension rims 5, preferably one at each side of the main rim, said extension rims in the present instance comprising each an annular rim member 5$^a$ (which may be plain or furnished with a rubber tire 5$^b$, or of other form), and an annular web 5$^c$ extending radially inwardly from the center of the rim member 5$^a$, to adapt the extension rim to be fastened in place as herein later described.

In order to provide seats for the extension rims, there are provided a number of extension rim supporting elements in the form of yokes 6 of the specific form shown in Fig. 4, which yokes are applied at intervals to the main rim, in the spaces between the traction cleats when the latter are employed.

Each of these yokes consists as shown in Figs. 1 and 4, of a central elevated portion 6$^a$ containing in its inner side a socket 6$^b$ to fit over the outer peripheral edge of the main rim, arms 6$^c$ extending laterally in opposite directions from the central portion and forming seats 6$^d$ for the extension rims, and terminal portions 6$^e$ extending radially inwardly from the ends of the arms 6$^c$.

The side walls of the sockets 6$^b$ in the supporting yokes are inclined to correspond with the sloping side faces 3$^c$ of the main rim, whereby when the yokes are drawn down on the main rim on the fastening of the yokes in place, these sloping surfaces cooperating with each other, will act with a wedging effect and will cause the yokes to be wedged tightly on the rim, it being observed that there is a slight clearance 7 between the outer face of the rim and the bottom of the sockets in the supporting yokes, to enable the sloping surfaces to wedge against each other.

In the present instance, the supporting yokes 6 are fastened detachably on the rim by means of fastening bolts 8 extending through bolt holes in the main rim and through holes in the central elevated portions of the yokes, and having on their outer ends, heads 8$^a$ bearing against the outer face of the rim, and on their inner ends, nuts 8$^b$ bearing against washer plates 8$^c$ surrounding the bolts, and bearing in turn against the inner edge of the channel rim member. By turning up the nuts, the supporting yokes will be drawn down on the main rim, and the sloping contacting surfaces on the yokes and rim cooperating with each other, the yokes will be wedged tightly on the rim with little or no liability of looseness or displacement.

The seats 6$^d$ on the laterally extending arms 6$^c$ of the supporting yokes slope or incline toward the center of the wheel, and the rims of the extension wheels are adapted at their inner sides to seat over these sloping surfaces as shown in Fig. 1; and in order to cause the rims to seat on the supporting yokes with a wedging action, the inner surfaces of the rim members of the extension rims, where said surfaces contact with the sloping seats 6$^d$ of the supporting yokes, are similarly inclined or sloped so that when the extension rims are drawn up on their seats on the supporting yokes, they will wedge thereon.

With the extension rims seated in position on the supporting yokes as shown, the webs 5$^c$ on the extension rims will extend alongside the inner terminal portions of the two series of yokes at the outer sides of the main rim, and the extension rims are drawn up on their seats and held in position, in the present instance by means of horizontal fastening bolts 10 extending through bolt holes in the terminal portions of the supporting yokes and through holes in the webs of the extension rims. When the nuts of these bolts are screwed up, the rims will be drawn inwardly and the sloping surfaces cooperating with each other, the extension rims will be wedged to their seats. The bolt holes in the webs of the extension rims are slightly greater in diameter than that of the bolts in order to provide for a slight play of the parts and thereby enable them to act with the wedging effect described.

The extension rims may have their treads variously formed, and the rims may be of a diameter to bring about different relations between their tread surfaces and the tread surface of the main rim when the latter is not equipped with traction cleats, and between their tread surfaces and the active ends of the traction lugs when the main rim is equipped with such lugs. The parts may be arranged as shown in the drawings, where it will be seen that the tread surfaces of the extension rims terminate inward of the active ends of the traction cleats, or the parts may be arranged so that the tread surfaces of the extension rims will be flush with, or they may extend beyond the traction cleats; and in the event that traction cleats are not provided, the tread surfaces of the extension rims may extend outward of the main rim, or in other relations thereto.

It will be obvious that where a wheel is employed equipped with traction cleats as shown, the extension rims may be applied or removed in the manner hereinbefore described, without in any way disturbing or removing the traction cleats. This I consider a very important advantage, in that it is very difficult in many cases to remove the traction cleats, and much time and labor is saved by leaving them in place, as may be done in the application of the extension rims in the manner hereinbefore described, since the rim supporting yokes are readily applied at intervals between the traction cleats, and the extension rims may be readily applied to the supporting yokes without necessitating any change in the traction lugs or their removal.

In the accompanying drawings the invention has been shown merely by way of example and in preferred form, and obviously many modifications and variations may be made therein which will still be comprised within its spirit. It is to be understood, therefore, that the invention is not limited to any specific form or embodiment, except insofar as such limitations are specified in the appended claims.

Having thus described my invention, what I claim is:

1. In a wheel structure, the combination of a main rim formed with a side face sloping axially outwardly, extension rim supporting-members applied at intervals to said main rim and extending laterally thereof to form seats at the side of the main rim for an extension rim, the said supporting-members being each provided in its radially inner side with a socket to seat over the main rim and said socket having a sloping side wall to cooperate with the sloping face of the rim to act with a wedging effect, devices for fastening the supporting-members in place on the main rim and operable to draw the said members down on the rim with a wedging action, and an extension rim fastened to the seats of the supporting-members.

2. In a wheel structure, the combination of a main rim having side faces sloping outwardly in opposite directions from each other, extension rim supporting yokes each provided in its radially inner side at its center with a socket to seat over the main rim, and having also portions extending laterally in opposite directions from the socket to serve as supports for extension rims, said sockets having opposing sloping walls to wedge upon the sloping side faces of the main rim when said yokes are drawn downwardly on the rim, bolts extending through the socketed portions of the supporting yokes and through the main rim, and operable to draw the supporting yokes down on the main rim with a wedging effect, and extension rims seated on the laterally extending portions of the supporting yokes.

3. In combination with a wheel structure having a main rim formed with side faces sloping axially outwardly, extension rim supporting members having correspondingly formed attaching portions and secured to the main rim each by an interlocking clamp connection therewith and extending laterally therefrom to form seats for an extension rim at one side of the main rim, said seats sloping at a slight inclination toward the axis of the wheel and forming wedging surfaces, an extension rim provided on its radially inner side with a sloping annular wedging surface bearing directly upon those of the supporting members, and fastening devices engaging the supporting members and extension rim at points radially inward of said wedging surfaces, and operable to draw the extension rim axially on its seats with a wedging action.

4. In combination with a wheel structure having a main rim formed with side faces sloping axially outwardly, extension rim supporting members having correspondingly formed attaching portions and secured to the main rim each by an interlocking clamp connection therewith and having a laterally extending rim supporting portion sloped on its radial outer face, and formed also with a radial inwardly extending terminal portion, an extension rim formed with an axially extending portion sloped on its radial inner side to correspond with the sloping portions of the rim supporting members, and seated directly upon said lateral sloping portions of the rim supporting members, said extension rim having also a radial portion extending alongside the terminal portions of the supporting members, and bolts extending through the radial portion of the extension rim and through the terminal portions of the rim supporting members, and operable to draw the extension rim axially to seat it tightly on its supports with a wedging action and thereby hold the same in place.

HENRY J. ROBER.